United States Patent [19]

Gentner

[11] Patent Number: 5,796,404

[45] Date of Patent: Aug. 18, 1998

[54] COMPUTER SYSTEM HAVING ALPHANUMERIC KEYBOARD ACCESS TO OBJECTS IN GRAPHICAL USER INTERFACE

[75] Inventor: Donald R. Gentner, Palo Alto, Calif.

[73] Assignee: Sun Microsystems, Inc., Palo Alto, Calif.

[21] Appl. No.: 676,087

[22] Filed: Jul. 1, 1996

[51] Int. Cl.$^6$ ............................................. G06F 3/00
[52] U.S. Cl. ................................... 345/352; 345/168
[58] Field of Search ........................... 395/333, 334, 395/335, 339, 348, 349, 352; 345/333, 334, 339, 352, 353, 354, 356, 357, 168; 341/22

[56] References Cited

U.S. PATENT DOCUMENTS

| | | | |
|---|---|---|---|
| 5,006,001 | 4/1991 | Vulcano | 400/486 |
| 5,646,648 | 7/1997 | Bertram | 345/168 |
| 5,694,562 | 12/1997 | Fisher | 395/349 |

OTHER PUBLICATIONS

A. Simpson, "Mastering WordPerfect 5.1 & 5.2 for Windows", SYBEX, 1993. pp. 9–10.

*Primary Examiner*—A. Katbab
*Attorney, Agent, or Firm*—Bronson, Bronson & McKinnon

[57] ABSTRACT

An electronic digital computer system includes a Graphical User Interface (GUI) for displaying graphical objects such as icon buttons, scrolling text lists, and text entry fields on a monitor. A keyboard includes a label key such as a conventional alternate (Alt) key which, when depressed, causes alphanumeric characters to be superimposed on the graphical objects. Depression of an alphanumeric key on the keyboard corresponding to the alphanumeric character superimposed on a selected object causes an associated operation to be launched. The GUI includes an object table having an entry for each graphical object. Each entry includes an object name, corresponding alphanumeric character, object type (e.g. icon button, text input field), and object display position. A display generator accesses the object table using the object names as inputs, obtains the alphanumeric characters as outputs, and superimposes and displays the alphanumeric characters on the objects. The alphanumeric characters are displayed at positions that are offset from the object display positions by predetermined distances and directions corresponding to the object types.

30 Claims, 9 Drawing Sheets

COMPUTER SYSTEM HAVING ALPHANUMERIC KEYBOARD ACCESS TO OBJECTS IN GRAPHICAL USER INTERFACE

BACKGROUND OF THE INVENTION

1. Field of the Invention

The present invention generally relates to the art of electronic digital computers having graphical object displays, and more specifically to a computer system having alphanumeric keyboard access to objects in a Graphical User Interface.

2. Description of the Related Art

A Graphical User Interface (GUI) is a convenient mechanism for enabling a user to interface with an electronic digital computer. A GUI displays various graphical interface objects on a monitor screen which can be selected using a pointing device such as a mouse or a trackball. The user moves the pointing device to position an arrow or other cursor icon over an object to be selected, and clicks a button on the pointing device to make the selection. In response, an operation (procedure, application, etc.) which is represented by the object is launched.

The graphical interface objects typically include buttons with iconic labels, scrolling text lists, and text entry fields that are very convenient to access with a pointing device. However, pointing devices are not usable by some persons, including those suffering from afflictions of the hand or wrist such as carpal tunnel syndrome. This latter group of users are unable to position a mouse and simultaneously click a button on the mouse due to severe wrist pain.

Pointing devices are also not usable by disabled persons such as quadriplegics who are, however, able to depress individual keys on a keyboard using sticks held in their mouths.

Other users, although not suffering from any disability, simply do not like to use pointing devices, and some power users feel that pointing devices are too slow.

It is therefore desirable to provide a mechanism by which users such as described above can access a graphical interface object of a GUI directly from a conventional alphanumeric keyboard. Various mechanisms have been proposed to accomplish this purpose in the prior art, such as illustrated in FIG. 1.

Figure 1:
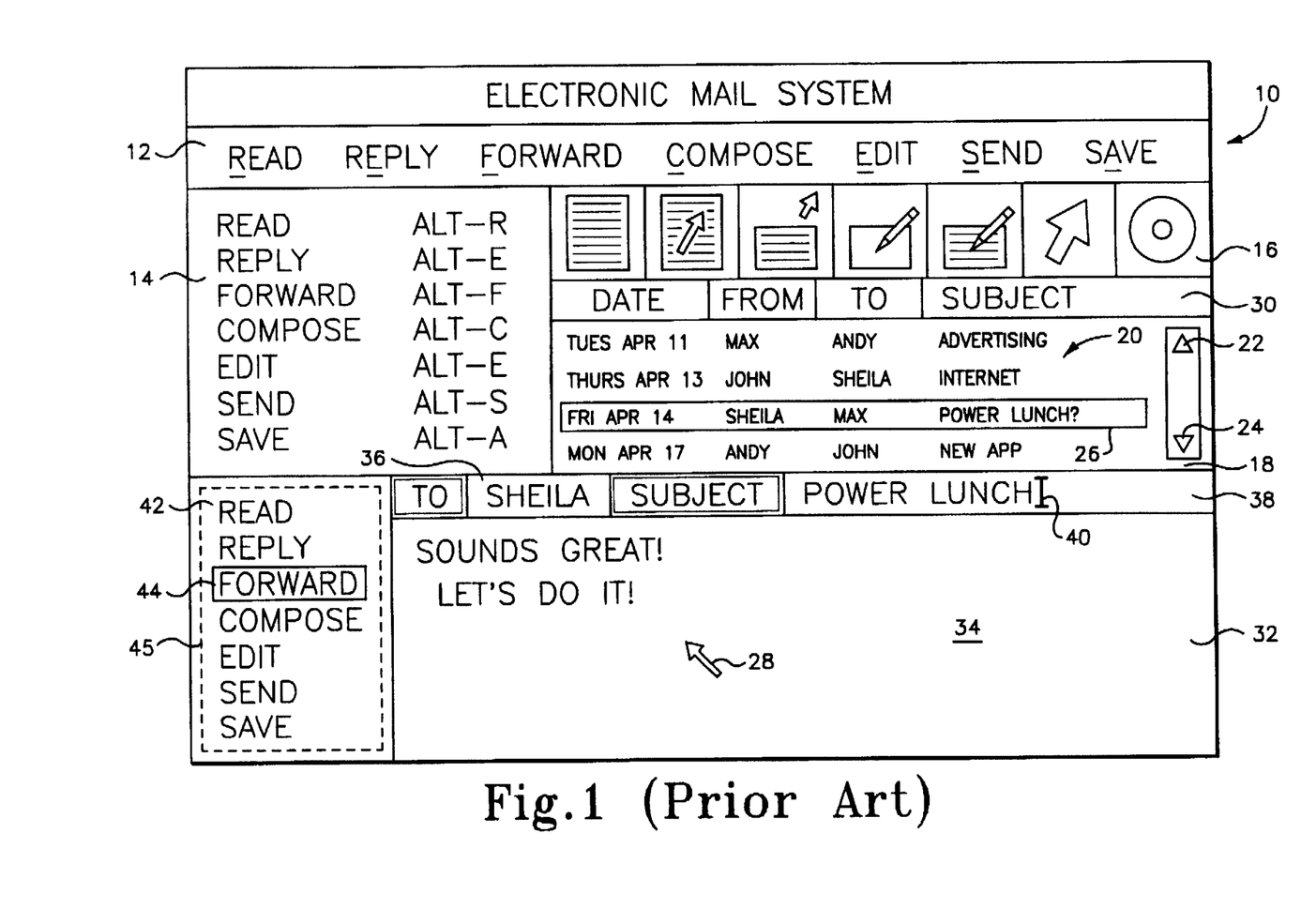
FIG. 1 is a composite diagram illustrating prior art methods of accessing graphical interface objects on a computer display using an alphanumeric keyboard.

FIG. 1 illustrates exemplary keyboard accessible graphical objects of a GUI 10 in the form of an electronic mail (e-mail) system. It will be noted that this drawing is not intended to illustrate an actual application, but is a composite diagram for presenting various types of prior art GUI displays.

The GUI 10 includes a menu bar 12 having a "mnemonic character" graphical display including mnemonic text labels that enable a user to, for example, read mail (READ), reply to a received message (REPLY), forward a received message (FORWARD), compose a new message (COMPOSE), edit a new message (EDIT), send a new message (SEND), or save a message to disk (SAVE).

More specifically, one letter of each text label in the menu bar 12 is underlined. The user can select an option, for example reading mail (READ), by depressing a label key such as a conventional alternate (Alt) key while "simultaneously" depressing the underlined letter "R" in the word "READ".

FIG. 1 further illustrates a "keyboard accelerator" box 14 including a menu having the same options as presented in the menu bar 12. In this case, each menu item includes a word representing the option, and a combination of keystrokes or "hot key" combination that can be used to immediately launch the corresponding operation. In this exemplary case also, the read option can be activated by simultaneously depressing the Alt key and the R key.

Although usable, these prior art mechanisms for accessing graphical interface objects using an alphanumeric keyboard are undesirable in that a separate menu box including a text list of the available options is required in addition to any graphical icons for the same items. These methods are not usable at all for GUI displays which consist entirely of icon buttons and text input fields without text labels as will be described below.

FIG. 1 further illustrates an icon button panel 16 which consists of graphical icon buttons for selecting the same options as in the menu bar 12. A "scrolling window" 18 is also shown, including a column of text items 20 such as received messages, up and down arrows 22 and 24, and a fixed rectangular frame 26 or highlight block which indicates a current text item.

The scrolling window 18 is conventionally operated by using a mouse or other pointing device to position an arrow 28 or other cursor icon on the arrow 22 or 24, and clicking or holding down the mouse button to cause the list of text items 20 to scroll up or down until the desired text item is positioned in the frame 26.

The user then positions the arrow 28 on the text item in the frame using the mouse, and clicks the mouse button to select the item. Alternatively, the arrow 28 can be positioned on a text item which is not in the frame 26, and the mouse button clicked to select the item. Finally, an Enter or other key on the keyboard can be depressed to activate a text item which is positioned in the frame 26.

Further illustrated is a sort bar 30 having buttons which can be selected using the mouse to cause the text entries to be sorted by date, sender, recipient, or subject.

FIG. 1 further illustrates a "text entry" box 32 which enables a user to compose a new message using an alphanumeric keyboard. The box 32 includes a text entry field 34 which displays the actual text being entered. Two additional text entry fields 36 and 38 are provided for entering the name of the addressee and the subject of the message.

The field 34, 36 or 38 into which text is desired to be entered is selected by positioning the arrow 28 in the corresponding field using the mouse, and clicking the mouse button. As shown, an insertion cursor 40 in the form of a vertical "I-beam" is displayed after the letter "H" in the subject field 38, indicating that the subject field 38 has been selected for text entry, and that the text entry position is at the end of the existing text in the field 38.

FIG. 1 further illustrates a menu box 42 including the same options as in the menu bar 12. This selection mechanism uses a rectangular location cursor 45 and a selection bar 44 to designate a menu option. The selection bar 44 is moved by repeatedly depressing an arrow key on a keyboard. Each keypress advances the cursor to the next menu option. When the cursor 44 has been moved to the desired option, a space key or other key is depressed to activate the option.

The location cursor arrangement can be expanded globally to enable selection of all of the illustrated menus, icon buttons and text input fields from the keyboard. In such a case, the user repeatedly depresses another key, such as the Tabulation (Tab) key, to step a cursor 45 through the major blocks of the display 50. For example, repeated depression of the Tab key will move the cursor from the menu bar 12 to the keyboard accelerator box 14, to the first button in the icon button panel 16, to the second button in the panel 16, etc.

The cursor 45 is shown as being positioned over the menu box 42, and can be in the form of a rectangular box, a different color block, inverse video, etc. After the desired major block is selected using the Tab key, in this case the menu box 32, the keyboard arrow keys are used to move the cursor 44 within the block, and the space key is depressed to select the desired option within the block as described above.

Although enabling access to all of the graphical objects of the display 50 from an alphanumeric keyboard, the global location cursor arrangement is undesirable in that the tab key may have to be depressed many times to move the cursor to a selected item.

In summary, the scrolling list display and text entry field selection mechanism as illustrated in FIG. 1 are not efficiently accessible from a keyboard. There is a need to provide this capability which will especially enable the special types of users described above to access graphical interface objects in accordance with their requirements.

SUMMARY OF THE INVENTION

The present invention overcomes the drawbacks of the prior art, and provides the heretofore needed ability to efficiently access graphical interface objects using a conventional alphanumeric keyboard. This includes types of objects such as graphical icon buttons and scrolling text lists that could be accessed only with considerable difficulty in the prior art.

In accordance with the present invention, an electronic digital computer system includes a Graphical User Interface (GUI) which utilizes a unique method for displaying and selecting graphical objects such as icon buttons, scrolling lists, and text entry fields on a monitor.

A keyboard includes a label key such as a conventional alternate (Alt) key which, when depressed, causes alphanumeric characters to be superimposed on the graphical objects. Depression of an alphanumeric key on the keyboard corresponding to the alphanumeric character superimposed on a selected object causes an associated operation (procedure, application, etc.) to be launched.

The GUI includes an object table having an entry for each graphical object. Each entry includes an object name, corresponding alphanumeric character, object type (e.g. icon button, text input field), and object display position. A display generator accesses the object table using the object names as inputs, obtains the alphanumeric characters as outputs, and superimposes and displays the alphanumeric characters on the objects.

The alphanumeric characters are displayed at positions which are offset from the object display positions by predetermined distances and directions corresponding to the object types.

The present invention improves over prior art mnemonic character, keyboard accelerator and location cursor arrangements in that it does not require a separate text menu, or require that objects have text labels. The present arrangement is much faster than a location cursor system in that only one keystroke is required to select a graphical object.

The arrangement of the invention is especially desirable for persons suffering from afflictions such as carpal tunnel syndrome, because any graphical object can be selected using simple key presses. The invention also enables quadriplegics to access graphical user interfaces from a keyboard using a single stick.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 2:
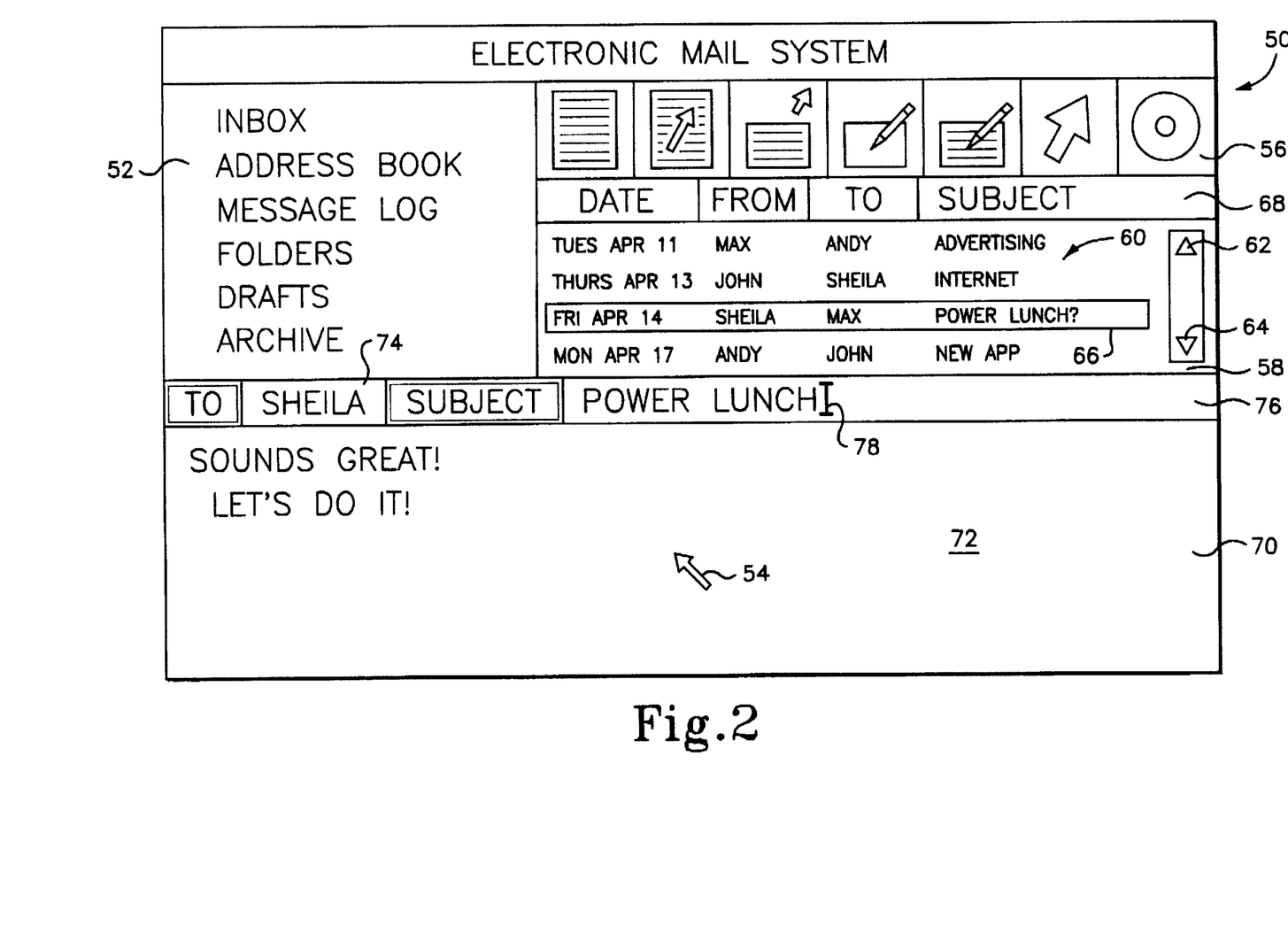
FIG. 2 is a diagram illustrating the appearance of a graphical object display in accordance with the present invention prior to activation for keyboard object access.

An exemplary Graphic User Interface (GUI) display 50 according to the present invention is illustrated in FIG. 2. The drawing illustrates an electronic mail (e-mail) system, although the invention is not limited to any particular application.

The display 50 includes a menu box 52 with a plurality of text labels corresponding to options including INBOX, ADDRESS BOOK, etc. as illustrated. These options are normally accessed by positioning an arrow 54 or other cursor icon over the text label of the desired option using a pointing device such as a mouse, and clicking a button on the mouse to select the option.

FIG. 2 further illustrates an icon button panel 56 which consists of graphical icon buttons that enable a user to, viewed from left to right, read mail, reply to a received message, forward a received message, compose a new message, edit a new message, send a new message, or save a message to disk. These buttons are normally accessed by moving the arrow 54 over the button corresponding to the selected option, and clicking the mouse button.

A "scrolling window" 58 is also shown, including a column of text items 60 such as received messages, up and down arrows 62 and 64, and a rectangular frame 66 or highlight block which acts as a cursor to indicate a current text item.

The scrolling window 58 is conventionally operated by using a mouse or other pointing device to position the arrow 54 over the arrow 62 or 64, and clicking or holding down the mouse button to cause the frame 66 to move up or down on the display. Further illustrated is a sort bar 68 having buttons which can be selected using the mouse to cause the text entries to be sorted by date, sender, recipient, or subject.

FIG. 2 further illustrates a "text entry" box 70 which enables a user to compose a new message using an alphanumeric keyboard. The box 70 includes a text entry field 72 which displays the actual text being entered. Two additional text entry fields 74 and 76 are provided for entering the name of the addressee and the subject of the message.

The field 72, 74 or 76 into which text is desired to be entered is conventionally selected by positioning the arrow 54 in the corresponding field using the mouse, and clicking the mouse button. As shown, an insertion cursor 78 is displayed after the letter "H" in the subject field 76 indicating that the subject field 76 has been selected for text entry, and that the current text entry position is at the end of the field.

It will be noted that a GUI embodying the present invention preferably retains the capability of a pointing device s using a pointing device such as a mouse, and that this method of access can be used instead of or in combination with the keyboard access provided by the invention as desired by a particular user.

Figure 3:
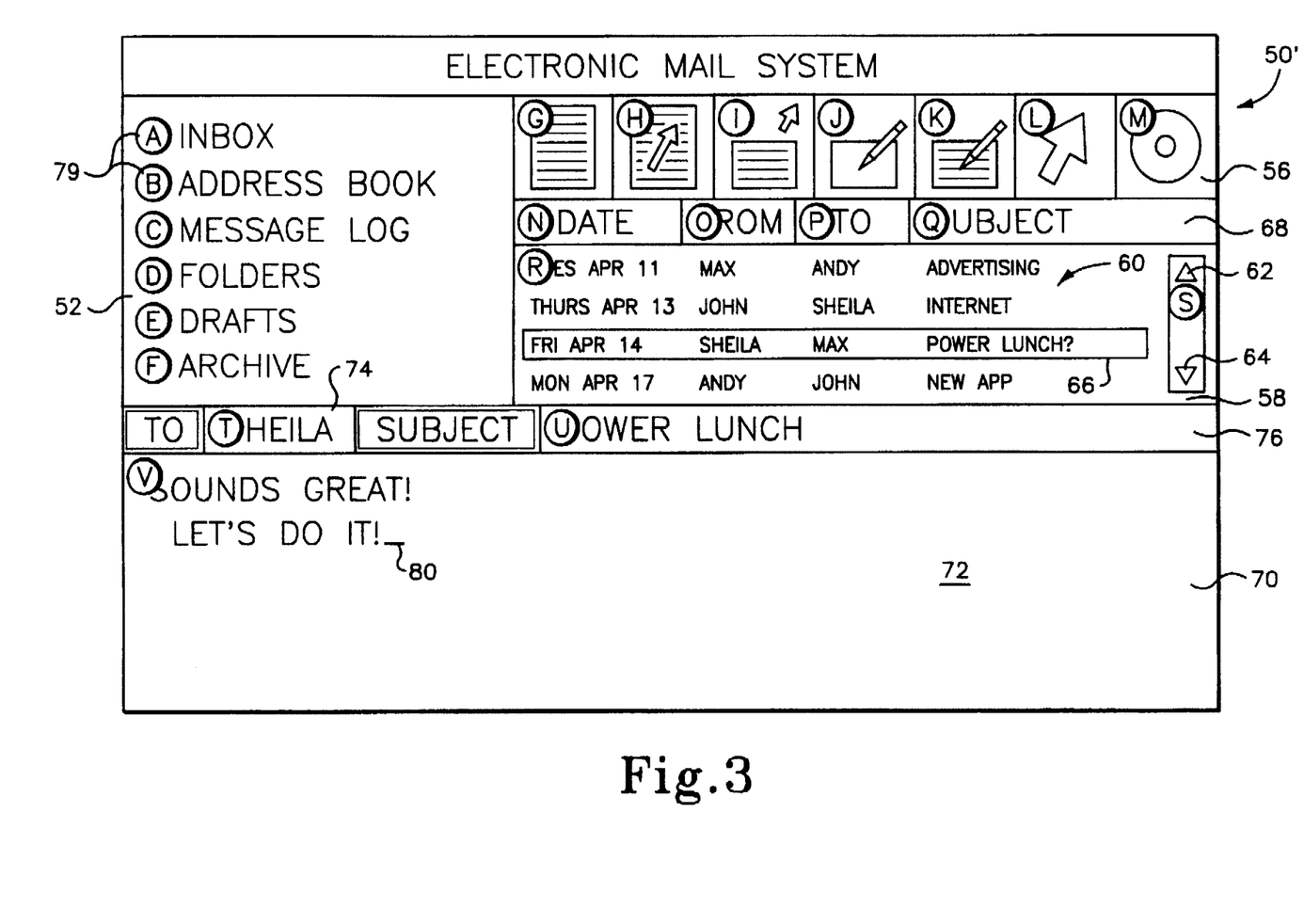
FIG. 3 is similar to FIG. 2, but illustrates the display after activation.

In accordance with the present invention as illustrated in FIG. 3, all of the graphical interface objects in the display 50 can be accessed efficiently using a conventional alphanumeric keyboard, without the need of having a pointing device connected to the computer.

As will be described in detail below, the display 50 of FIG. 2 is transformed into a display 50' as illustrated in FIG. 3 by depressing a "label key" on an alphanumeric keyboard. The label key is preferably the alternate (Alt) key, although the invention is not so limited.

It is within the scope of the invention to use another key, such as the control (Ctl) key as the label key. Another option is to use a combination of keys as the "label key". For example, the display 50' can be produced by simultaneously depressing the Ctl and Alt keys.

The display 50' differs from the display 50 in that alphanumeric labels or "activation characters" are superimposed on each graphical interface object. As shown in the drawing, activation characters "A" to "F" are superimposed on the text labels in the menu box 52, activation characters "G" to "M" are superimposed on the icon buttons in the icon button panel 56, and activation characters "N" to "Q" are superimposed on the sort fields in the sort bar 68.

In addition, the character "R" is superimposed on the scrolling window 58, the character "S" is superimposed on the area including the up and down arrows 62 and 64, and the characters "T", "U" and "V" are superimposed on the addressee, subject and message fields of the text entry box 70.

It will be noted that the term "superimposed on" as used in the context of the present invention does not require that the alphanumeric characters be displayed directly over and obscure portions of underlying graphical objects. The characters can be displayed closely adjacent to the corresponding objects as in the illustrated menu box 52 within the meaning of the term as used herein.

As is further shown in FIG. 3, the alphanumeric characters are illustrated as being enclosed in "frames" as indicated at 79. The frames 79 have oval shapes, with their height being larger than their width. However, the shape of the frames 79, or their provision, is not limited within the scope of the invention.

It is further preferable to increase the legibility of the display by obscuring all visible matter within the frames 79 except for the characters. For example, the frames 79 themselves can be black, the area within the frames 79 can be white, and the characters can be black. Thus, the legibility of the characters will not be reduced by any visible matter in a graphical object over which a character is superimposed.

After the display 50' of FIG. 3 has been activated by depressing the label key or keys, a desired graphical object is selected by depressing a key on the keyboard corresponding to the alphanumeric character superimposed on the object. For example, the text entry field 70 can be selected by depressing the "V" key on the keyboard. In this case, the field 70 is activated for composing the text of a message, and a cursor 80, is positioned at the end of any existing text. If the field does not contain any text, the cursor 80 is positioned at the first text entry position.

The other graphical objects are selected in the same manner. Selection of an object causes an associated operation to be performed. The operation can be launching a procedure or application, or performing any other suitable function. For example, depression of the "S" key activates the scroll function of the window 58. Rather than scrolling the text items 60 by using a mouse to select one of the arrows 62 and 64, scrolling is performed using up and down arrows on the keyboard.

The label key operation can be implemented in several ways within the scope of the invention. One alternative is to have the display 50' be generated as long as the label key (which will hereinafter assumed to be the Alt key) is depressed, and the operation corresponding to the selected graphical object launched upon depression of the associated alphanumeric key. This requires that the Alt key and the alphanumeric key be depressed simultaneously.

Another alternative is to use a "sticky key" arrangement, in which the display 50' will be generated upon depression of the Alt key, and will continue to be displayed even if the Alt key is released. The desired graphical object is then selected and the associated operation launched by depressing the corresponding alphanumeric key.

The sticky key arrangement further provides means to cancel the activation character display if it was selected erroneously, or if the user changes his or her mind. Preferably, the activation character display can be canceled and the original display 50 of FIG. 2 restored by depressing the label key a second time. However, the invention is not so limited, and any other key press or sequence can be provided for canceling the activation character display.

In the sticky key embodiment, only one key need be depressed at any one time. This is especially desirable for quadriplegics who are only able to depress one key at a time using a stick.

Figure 4:
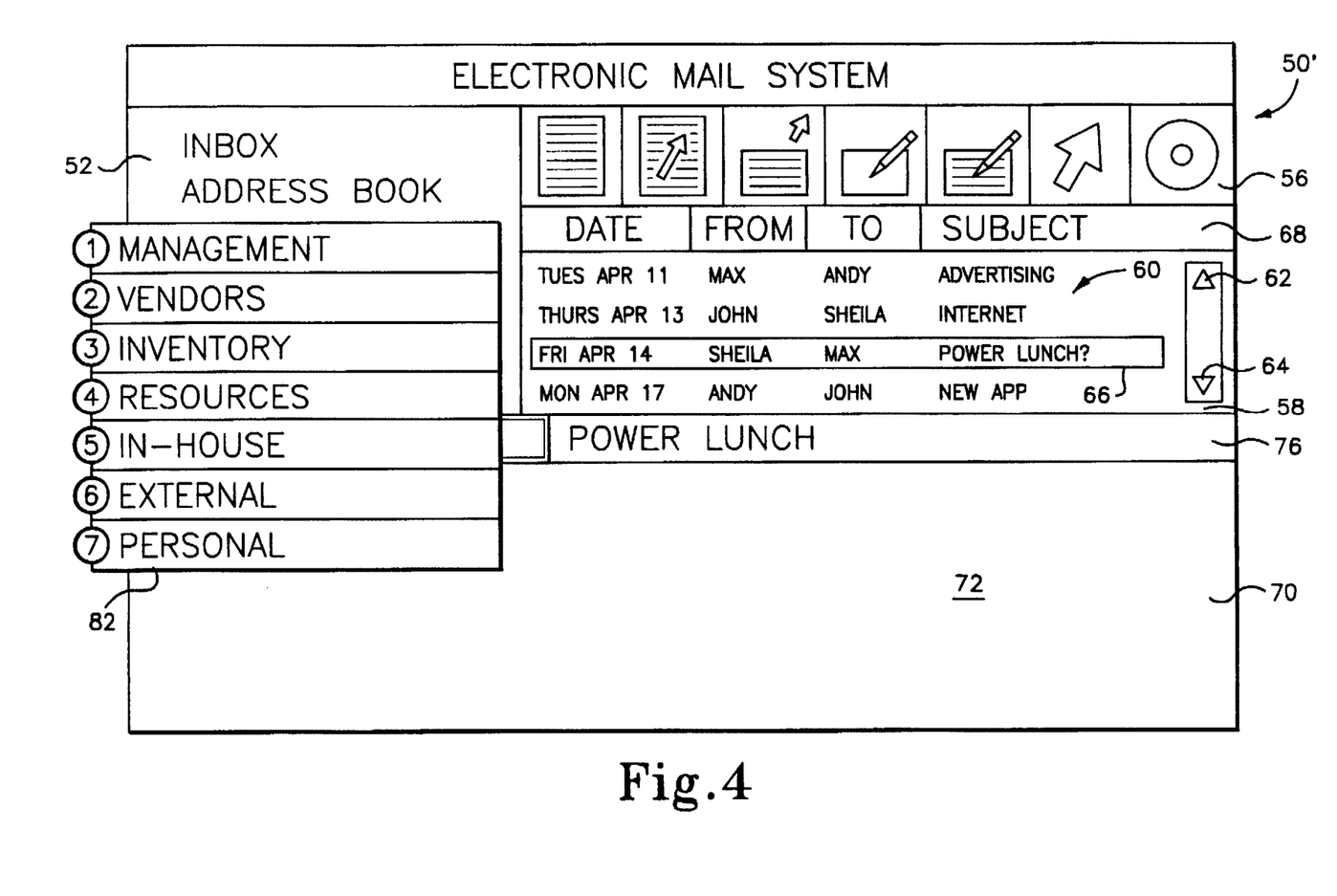
FIG. 4 is similar to FIG. 3, but illustrates activation of a second level of graphical objects for keyboard access.

The present invention can be expanded into a hierarchical or tree structure as illustrated in FIG. 4. In this case, depression of the "D" key which corresponds to the text object "FOLDERS" causes a submenu 82 to be generated. The submenu 82 includes a list of directories or folders in the user's e-mail system such as "MANAGEMENT", "VENDORS", etc., with the alphanumeric characters "1" to "7" being superimposed on (in this case displayed closely adjacent to) the corresponding text objects.

Depressing the "7", key on the keyboard will cause a text list of the user's personal messages to be displayed with another level of alphanumeric activation characters, although not explicitly illustrated. The present invention can be expanded to incorporate any number of hierarchical levels within the scope thereof.

It will be noted that the term "alphanumeric character" as used within the context of the present invention is not limited to letters and numbers, but includes any character that can be entered using a computer keyboard. Thus, characters such as comma ",", period ".", forward slash "/", and any other characters which may appear on conventional or special purpose keyboards are available for use within the scope of the invention.

Although it is preferred to use only lower case letter and number characters and other characters that can be entered by depressing only one key (without using the shift key), the invention is not so limited, and the upper case character set which can be accessed using the shift key in combination with another key is also available.

The implementation of the present invention will now be described with reference to FIGS. 5 to 12.

Figure 5:
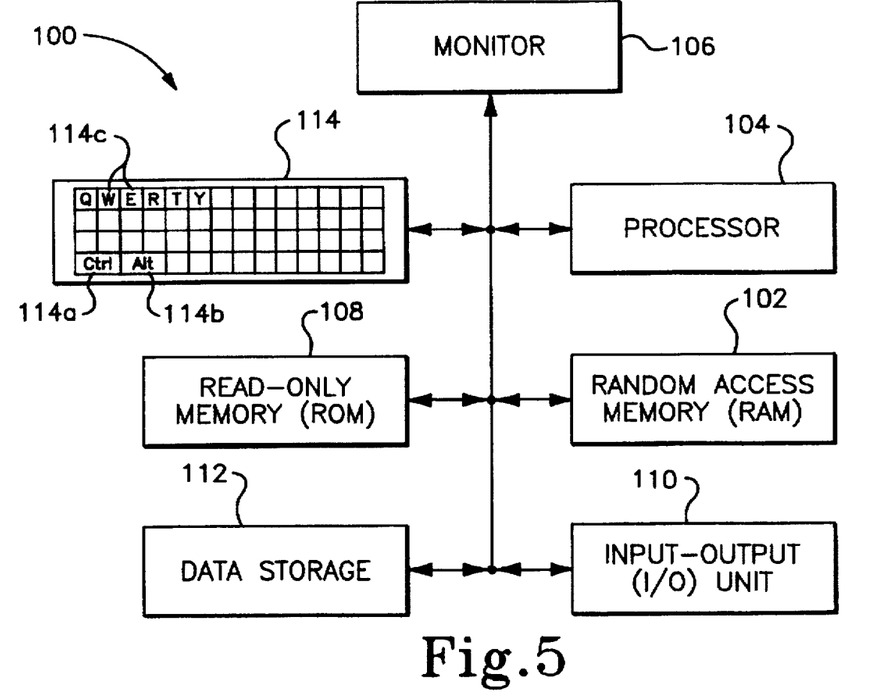
FIG. 5 is a simplified block diagram illustrating a computer system according to the present invention.

FIG. 5 illustrates a computer system 100 incorporating a GUI according to the present invention. The system 100 includes a random access memory (RAM) 102 in which the GUI is stored in the form of a software program, and a processor 104 for executing the program code. The system 100 further includes a visual display unit or monitor 106 for providing a visual display of the GUI and associated application, a read-only memory (ROM) 108 for storing firmware, and an input-output (I/O) unit 110 for connection to a printer, modem, etc.

The system 100 further includes a mass data storage 112 which can be any combination of suitable elements such as a fixed (hard) magnetic disk drive, a removable (floppy) disk drive, an optical (CD-ROM) drive, etc. Large application programs which incorporate a GUI of the present invention may be stored in the storage 112, and blocks of the programs loaded into the RAM 102 for execution as required.

User access to the system 100 is provided using an alphanumeric keyboard 114 which can be of conventional design. As shown, the keyboard 114 includes one or more label keys, such as a control (Ctl) key 114a and an alternate (Alt) key 114b, as well as a set of alphanumeric character keys 114c. The system 100 may also include a pointing device such as a mouse (not shown).

Figure 6:
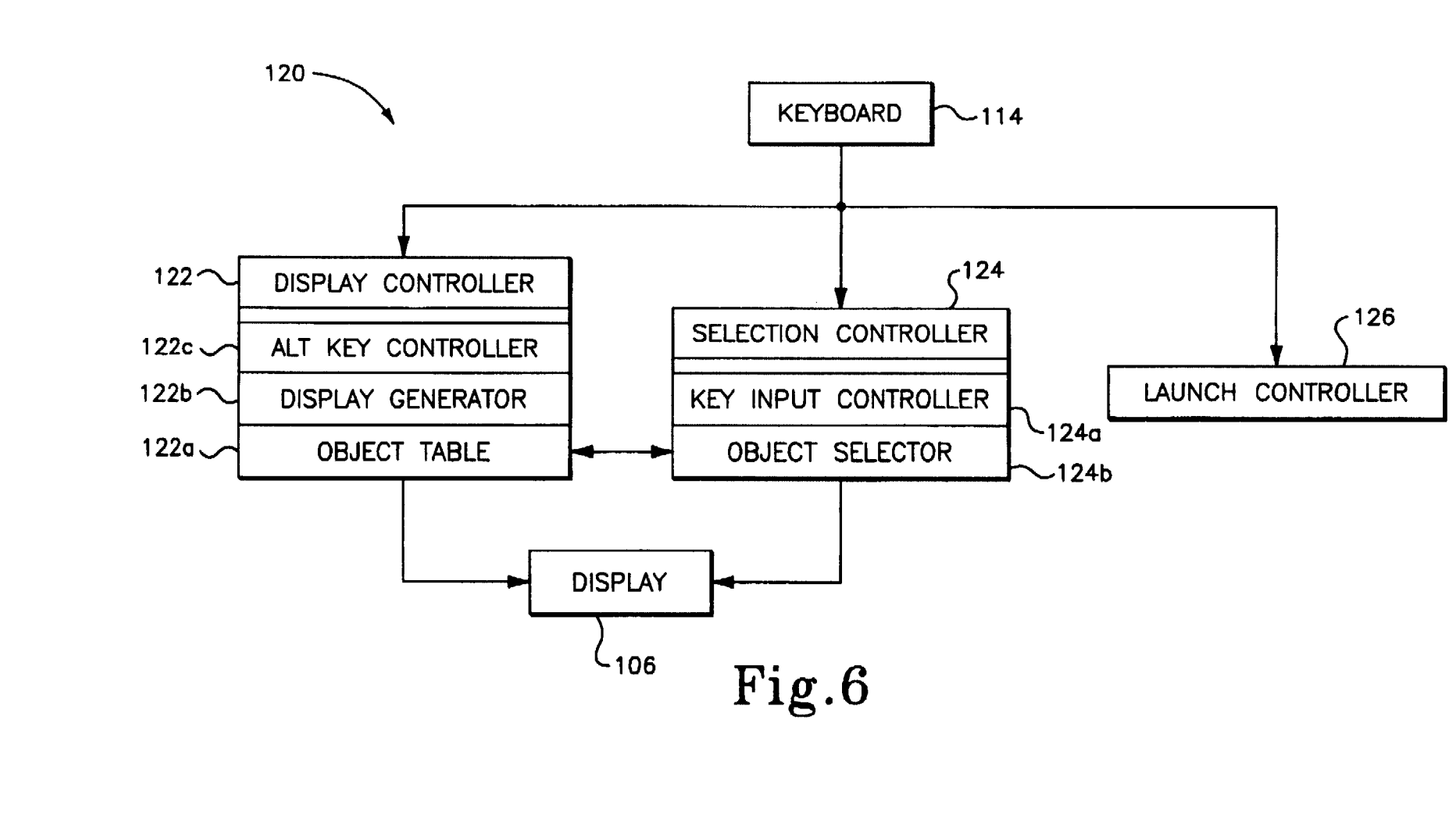
FIG. 6 is a block diagram illustrating a Graphical User Interface (GUI) of the computer system of FIG. 5.

A functional block diagram of a GUI 120 according to the present invention is illustrated in FIG. 6. The GUI 120 includes a display controller 122, a selection controller 124 and a launch controller 126 which are connected to the keyboard 114 for response to depression of keys. The display controller 122 and the selection controller 124 produce outputs which are displayed on the monitor or display 106.

The display controller 122 superimposes and displays characters corresponding to the character keys 114c on the displayed graphical objects in response to depression of the label key (the Alt key). The selection controller 124 selects objects in response to depression of the character keys 114c corresponding to the characters superimposed on the objects.

The display controller 122 includes an object table 122a including an entry for each graphical object, with each entry including an object name and a corresponding character. The display controller 122 further includes a display generator 122b which accesses the object table 122a using the object names as inputs, obtains the activation characters as outputs, and superimposes and displays the characters on the objects.

Each entry in the object table 122a further includes an object display position, and the display controller 122 displays the characters at character display positions corresponding to the object display positions.

Each entry in the object table 122a further includes an object type, and the display controller 122 displays the characters at the character display positions which are offset from the object display positions by predetermined distances and directions corresponding to the object types respectively.

For example, the characters "G" to "M" in FIG. 3 are displayed near the upper left corners of the corresponding icon buttons, and are thereby offset from the centers of the buttons upwardly and leftwardly by a predetermined distance and direction. The characters "A" to "F" are offset from the centers of the text objects only in the leftward direction by a predetermined distance.

A label (Alt) key controller 122c detects depression of the label (Alt) key and controls the display generator 122b to access the object table 122a as described above.

The selection controller 124 includes a key input controller 124a which produces characters corresponding to depressed character keys, and an object selector 124b which accesses the object table 122a using the characters produced by the key input controller 124a as inputs, obtains the corresponding object names as outputs, and select objects corresponding to the object names.

The launch controller 126 launches operations (procedures, applications, etc.) corresponding to selected objects by accessing a table (not shown) which links the operations to the characters.

The GUI 120 is loaded into the RAM 102 for execution, and can be distributed into several program modules. The present invention also includes a digital storage structure which can be, as illustrated in FIG. 7, the RAM 102 with the GUI 120 loaded therein.

The present invention also includes at least one digital recording medium which stores the GUI 120 for shipping to customers. The medium can be, for example, one or more optical disks (CD-ROM), one or more magnetic disks (floppy disks), or a combination thereof.

Figure 7:
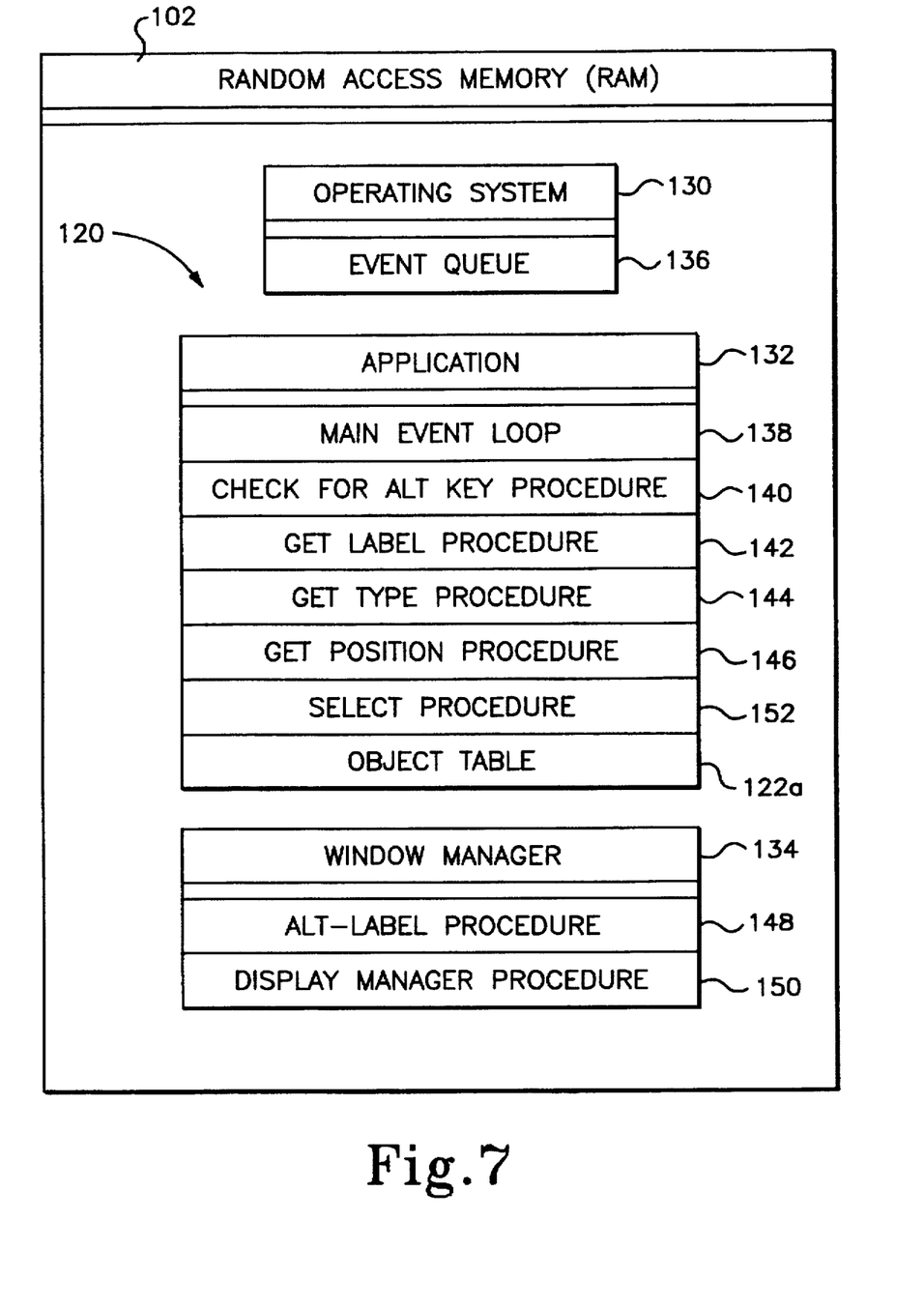
FIG. 7 is a block diagram illustrating a Random Access Memory (RAM) of the computer system of FIG. 5 which stores the GUI of FIG. 6.

As viewed in FIG. 7, the GUI 120 has components distributed in an operating system 130 (e.g. UNIX), an application 132 such as e-mail, and a window manager 134. Most of the functionality of the GUI 120 is preferably implemented in the operating system 130 and the window manager 134 so that all application programs can utilize the invention.

The operating system 130 includes an EVENT QUEUE 136 which detects and stores events such as key presses, and makes these events available to the rest of the system 100. The application 132 includes the object table 122a, and further includes a MAIN EVENT LOOP 138 and CHECK FOR ALT KEY PROCEDURE 140 which in combination perform the functionality of the Alt key controller 122c and the key input controller 124a.

The application 132 further includes a GET LABEL PROCEDURE 142, a GET TYPE PROCEDURE 144, and a GET POSITION PROCEDURE 146, which, in combination with an ALT-LABEL PROCEDURE 148 and a DISPLAY MANAGER PROCEDURE 150 in the window manager 134, provide the functionality of the display generator 122b. A SELECT PROCEDURE 152 in the application 132 provides the functionality of the selection controller 124 and the launch controller 126.

Figure 8:
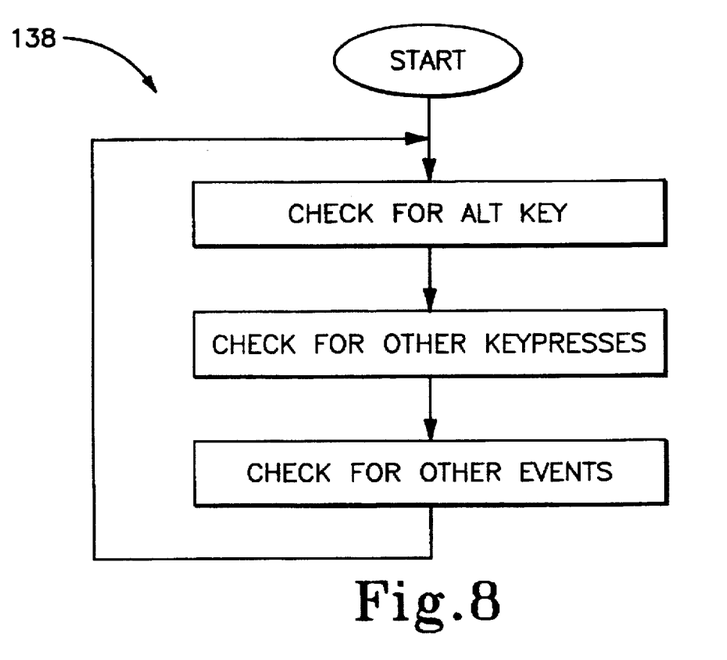
FIG. 8 is a flowchart illustrating a main event loop of an application program.

The operation of the MAIN EVENT LOOP 138 is illustrated in the form of a flowchart in FIG. 8. The loop 138 continuously checks for depression of the Alt key 114b by calling the CHECK FOR ALT KEY PROCEDURE 140. When the MAIN EVENT LOOP 138 detects depression of a character key after depression of the Alt key, it calls the SELECT PROCEDURE 152. The MAIN EVENT LOOP 138 also checks for other events that are required by the application 132, and loops back to the beginning.

Figure 9:
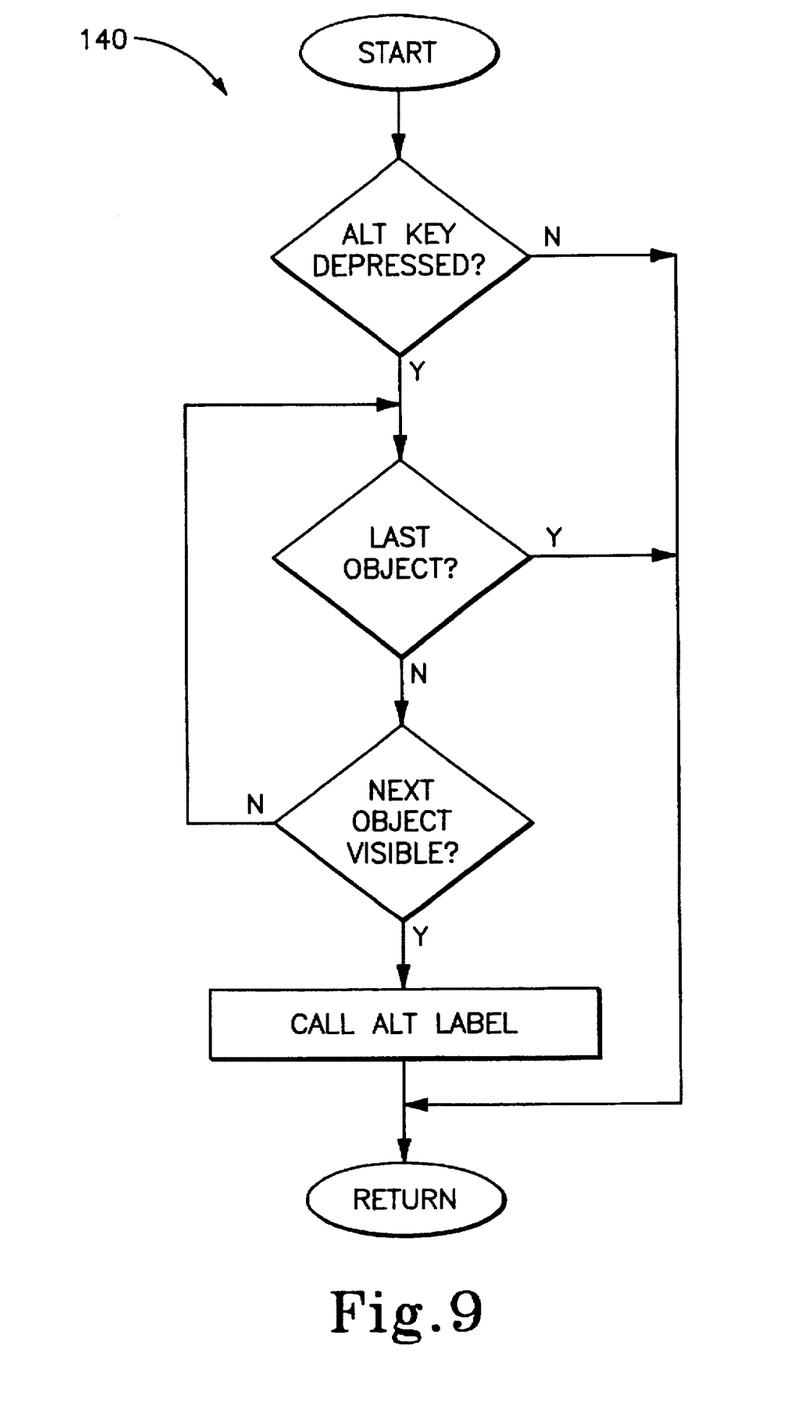
FIG. 9 is a flowchart illustrating a procedure which checks for depression of a label key.

The CHECK FOR ALT KEY PROCEDURE 140 is illustrated in FIG. 9. The procedure 140 first checks to see if the Alt key was depressed by interrogating the main event queue 136. If the Alt key was not depressed, the procedure 140 returns to the MAIN EVENT LOOP 138. If the Alt key was depressed, the procedure 140 causes the activation characters to superimposed on the corresponding graphical interface objects of the display.

The procedure 140 first checks to see if a current object is the last object. If so, the procedure 140 returns to the MAIN EVENT LOOP 138. If not, the procedure 140 determines if the current object is being displayed (is visible). If not, the procedure 140 loops back to check the next object. If so, the procedure 140 calls the ALT LABEL PROCEDURE 148. The procedure 140 loops back until all objects have been processed.

Figure 10:
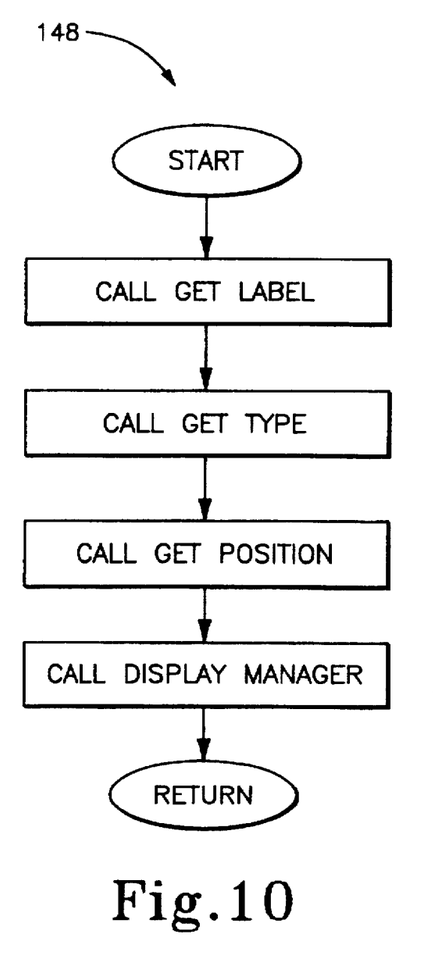
FIG. 10 is a flowchart illustrating a procedure which displays alphanumeric characters superimposed on graphical objects in response to depression of the label key.

The ALT LABEL PROCEDURE 148 is illustrated in FIG. 10. The procedure 148 sequentially calls the GET LABEL PROCEDURE 142, the GET TYPE PROCEDURE 144, and the GET POSITION PROCEDURE 146 which access the object table 122a with the name of the object as an input and obtain the label (corresponding character), object type and object position respectively as outputs. The procedure 148 then calls the DISPLAY MANAGER PROCEDURE 150 and returns to the CHECK FOR ALT KEY PROCEDURE 140.

Figure 11:
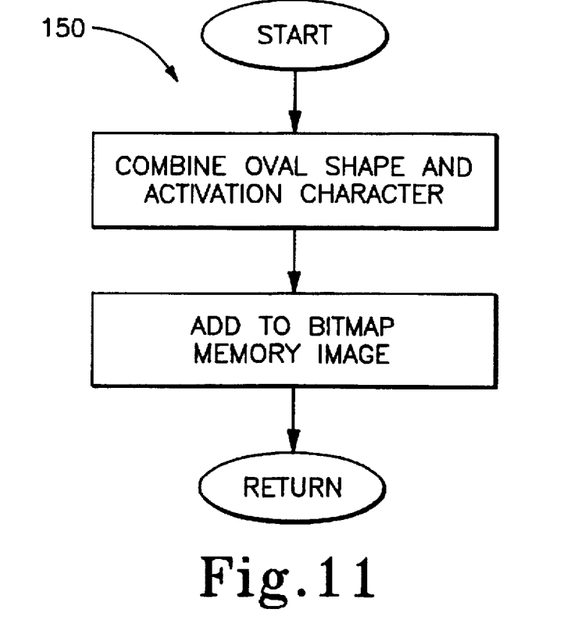
FIG. 11 is a flowchart illustrating a display procedure.

The DISPLAY MANAGER PROCEDURE 150 is illustrated in FIG. 11, and combines the oval shaped frame with the activation character. The procedure 150 calculates the position at which to display the character by algebraically combining the display position of the corresponding object with the offset corresponding to the object type. The procedure 150 then adds images of the frame and character to the bitmap image of the display in the RAM 102 and returns to the ALT LABEL ROUTINE 148. The combined bitmap image is displayed by the system 100 in a normal manner.

Figure 12:
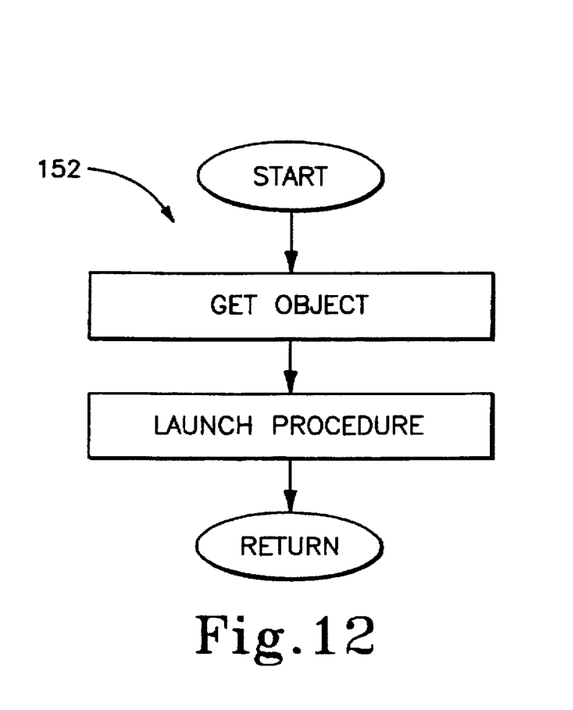
FIG. 12 is a flowchart illustrating a routine for launching a procedure corresponding to a selected graphical object.

Upon detection of depression of a character key after depression of the Alt key, the main event loop 138 calls the SELECT PROCEDURE 152 which is illustrated in FIG. 12. The procedure 152 accesses the object table 122a with the character corresponding to the depressed key, and obtains the name of the corresponding graphical object. The procedure 152 then access a table (not shown) to obtain the operation (procedure, application, etc.) corresponding to the selected object, and launches the operation.

In summary, the present invention improves over prior art mnemonic character, keyboard accelerator and location cursor arrangements in that it does not require a separate text menu. The present arrangement is much faster than a location cursor system in that only two keystrokes are required to select a graphical object.

The arrangement of the invention is especially desirable for persons suffering from afflictions such as carpal tunnel syndrome, because any graphical object can be selected using simple key presses. The invention also enables quadriplegics to access graphical user interfaces from a keyboard using a single stick.

Various modifications will become possible for those skilled in the art after receiving the teachings of the present disclosure without departing from the scope thereof. For example, although the present GUI has been described and illustrated as being implemented in software, the invention is not so limited, and the functionality of the GUI can alternatively be implemented in hardware in the form of, for example, an Application Specific Integrated Circuit (ASIC).

I claim:

1. A computer graphical user interface configured to display and select graphical objects using a keyboard that has at least one label key and a plurality of character keys, comprising:

a display controller configured to superimpose and display characters corresponding to the character keys on the objects respectively in response to depression of said at least one label key; and a selection controller configured to select objects in response to depression of character keys corresponding to the characters superimposed on the objects respectively.

2. An interface as in claim 1, in which the display controller comprises:

an object table including an entry for each object, each entry including an object name and a corresponding character; and a display generator configured to access the object table using the object names as inputs, obtain the characters as outputs, and superimpose and display the characters on the objects respectively.

3. An interface as in claim 2, in which:

each entry in the object table further includes an object display position; and the display controller is configured to display the characters at character display positions corresponding to the object display positions.

4. An interface as in claim 3, in which:

each entry in the object table further includes an object type; and the display controller is configured to display the characters at the character display positions which are offset from the object display positions by predetermined distances and directions corresponding to the object types respectively.

5. An interface as in claim 2, in which the display controller further comprises a label key controller configured to detect depression of said at least one label key and control the display generator to access the object table using the object names as inputs, obtain the characters as outputs, and superimpose and display the characters on the objects respectively in response thereto.

6. An interface as in claim 1, in which:

the display controller comprises an object table including an entry for each object, each entry including an object name and a corresponding character; and the selection controller comprises:

a key input controller configured to produce characters corresponding to depressed character keys;

an object selector configured to access the object table using the characters produced by the key input controller as inputs, obtain the corresponding object names as outputs, and select objects corresponding to the object names respectively.

7. An interface as in claim 6, further comprising a launch controller configured to launch operations corresponding to selected objects respectively.

8. An interface as in claim 7, in which:

the objects comprise a text entry field; and the launch controller is configured to, when the text entry field is selected, position a cursor at an end of text in the text entry field.

9. An interface as in claim 1, in which the display controller is configured to superimpose and display the characters on the objects only while said at least one label key remains depressed.

10. An interface as in claim 1, in which the display controller is configured to continue to superimpose and display the characters on the objects after said at least one label key has been released and until a character key has been depressed.

11. An interface as in claim 10, in which the display controller is further configured to continue to superimpose and display the characters on the objects until said at least one label key is again depressed.

12. An interface as in claim 1, in which said at least one label key consists of one label key.

13. An interface as in claim 1, in which:

said at least one label key consists of two label keys; and the display controller is configured to superimpose and display characters corresponding to the character keys on the objects respectively in response to simultaneous depression of the two label keys.

14. An interface as in claim 1, in which the display controller is further configured to display frames around the characters respectively.

15. An interface as in claim 14, in which the frames have oval shapes.

16. An interface as in claim 1, in which the objects comprise at least one of an icon button, a scrolling text list, and a text entry field.

17. A computer implemented method for graphically displaying and selecting objects using a keyboard that has at least one label key, and a plurality of character keys, comprising the steps of:

(a) superimposing and displaying characters corresponding to the character keys on the objects respectively in response to depression of said at least one label key; and (b) selecting objects in response to depression of character keys corresponding to characters superimposed on the objects respectively.

18. A method as in claim 17, in which step (a) comprises the substeps of:

(a1) storing an entry for each object in an entry table, each entry including an object name and a corresponding character;

(a2) accessing the object table using the object names as inputs;

(a3) obtaining the characters as outputs; and (a4) superimposing and displaying the characters obtained in step (a3) on the objects respectively.

19. A method as in claim 18, in which:

step (a1) further comprises storing an object display position in each entry in the object table respectively; and step (a4) further includes displaying the characters at character display positions corresponding to the object display positions respectively.

20. A method as in claim 19, in which:

step (a1) further comprises storing an object type in each entry in the object table respectively; and step (a4) further includes displaying the characters at the character display positions which are offset from the object display positions by predetermined distances and directions corresponding to the object types respectively.

21. A computer system, comprising:

a memory configured to store a program including a graphical user interface which displays selectable objects;

a processor configured to execute the program;

a graphical display configured to display the objects; and a keyboard having at least one label key and a plurality of character keys;

the interface including:

a display controller configured to superimpose and display characters corresponding to the character keys on the objects in response to depression of said at least one label key; and a selection controller configured to select objects in response to depression of character keys corresponding to characters superimposed on the objects respectively.

22. A system as in claim 21, in which the display controller comprises:

an object table including an entry for each object, each entry including an object name and a corresponding character; and a display generator configured to access the object table using the object names as inputs, obtain the characters as outputs, and superimpose and display the characters on the objects respectively.

23. A system as in claim 22, in which:

each entry in the object table further includes an object display position; and the display controller is configured to display the characters at character display positions corresponding to the object display positions.

24. A system as in claim 23, in which:

each entry in the object table further includes an object type; and the display controller is configured to display the characters at the character display positions which are offset from the object display positions by predetermined distances and directions corresponding to the object types respectively.

25. A digital data storage structure which stores a computer program including a graphical user interface configured to display and select objects using a keyboard that has at least one label key, and a plurality of character keys, the interface comprising:

a display controller configured to superimpose and display characters corresponding to the character keys on the objects respectively in response to depression of said at least one label key; and a selection controller configured to select objects in response to depression of character keys corresponding to characters superimposed on the objects respectively.

26. A structure as in claim 25, in which the display controller comprises:

an object table including an entry for each object, each entry including an object name and a corresponding character; and a display generator configured to access the object table using the object names as inputs, obtain the characters as outputs, and superimpose and display the characters on the objects respectively.

27. A structure as in claim 26, in which:

each entry in the object table further includes an object display position; and the display controller is configured to display the characters at character display positions corresponding to the object display positions.

28. A structure as in claim 27, in which:

each entry in the object table further includes an object type; and the display controller is configured to display the characters at the character display positions which are offset from the object display positions by predetermined distances and directions corresponding to the object types respectively.

29. A structure as in claim 26, comprising an electronic memory configured to store the computer program.

30. A structure as in claim 26, comprising at least one digital recording medium configured to store the computer program.

* * * * *